(12) United States Patent
Stewart (10) Patent No.: US 8,763,389 B2
(45) Date of Patent: Jul. 1, 2014

(54) REACTION MASS AND SPRING OSCILLATOR FOR WAVE ENERGY CONVERTER

(75) Inventor: David B. Stewart, Cranbury, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 13/507,507

(22) Filed: Jul. 5, 2012

(65) Prior Publication Data

US 2014/0007567 A1    Jan. 9, 2014

(51) Int. Cl.
*F03B 13/18*   (2006.01)
*F03B 13/10*   (2006.01)
*F03B 13/12*   (2006.01)

(52) U.S. Cl.
USPC .................... 60/497; 60/501; 290/42; 290/53

(58) Field of Classification Search
USPC ................. 60/495–507; 290/42, 53
See application file for complete search history.

(56) References Cited

U.S. PATENT DOCUMENTS 7,443,046 B2 * 10/2008 Stewart et al. .................. 290/53
8,110,935 B2 *  2/2012 Shin ............................... 290/42

* cited by examiner

*Primary Examiner* — Kenneth Bomberg
*Assistant Examiner* — Christopher Jetton
(74) *Attorney, Agent, or Firm* — Henry I. Schenzer (57) ABSTRACT

A reaction mass and a spring are configured to form an "oscillator". The reaction mass is coupled to, and can wrap around, a first pulley via a first belt/cable. The spring is coupled to, and can wrap around, a second pulley via a second belt/cable. The first and second pulleys are mechanically linked together and are mounted so they rotate in tandem. The diameter of the second pulley is different than the diameter of the first pulley to cause the reaction mass to travel a different distance than the spring in response to the up down motion of the reaction mass. The first and second pulleys may be circular with the second pulley being made smaller than first. Alternatively, the first pulley may be circular and the second pulley a cam of varying radius.

10 Claims, 11 Drawing Sheets

FIG. 1

Prior Art

FIG. 2

Prior Art

REACTION MASS AND SPRING OSCILLATOR FOR WAVE ENERGY CONVERTER

BACKGROUND

This invention relates to a reaction mass and a spring configured to form a compact and economical internal "oscillator" which is well suited for use in a wave energy converter (WEC) system.

A known class of wave energy converter (WEC) systems includes two bodies [i.e., a "float" (or "shell") and a "spar" (or "shaft" or "column" or "piston")] which are designed to move relative to each other and a power-take-off device (PTO) coupled between the two bodies to convert their relative motion into useful energy (e.g., electrical power). A problem with these two body WEC systems is that the bearings and linkages between the float and spar and those associated with the PTO are complex and expensive because of the need to operate in water and because they are subjected to marine growth, contamination and corrosion. Also, the extent to which the float and spar can move relative to each other is limited thereby decreasing the potential for energy collection. Also, the design of a mooring (anchoring) system for a WEC consisting of two or more moving objects that interact directly with the water and waves is often complex.

The problems discussed above are overcome in known WEC systems which include a WEC device contained within a single body (e.g., a "float") that is acted upon by the waves. The WEC device includes a "reaction mass" attached to a spring and a power take-off device, coupled to the reaction mass. In this type of system, the enclosed reaction mass (m) is suspended from or supported by a mechanical spring that is connected to the float and whose force constant (k) is tuned to give the desired natural period ($T_n$) of the WEC.

Figure 1:
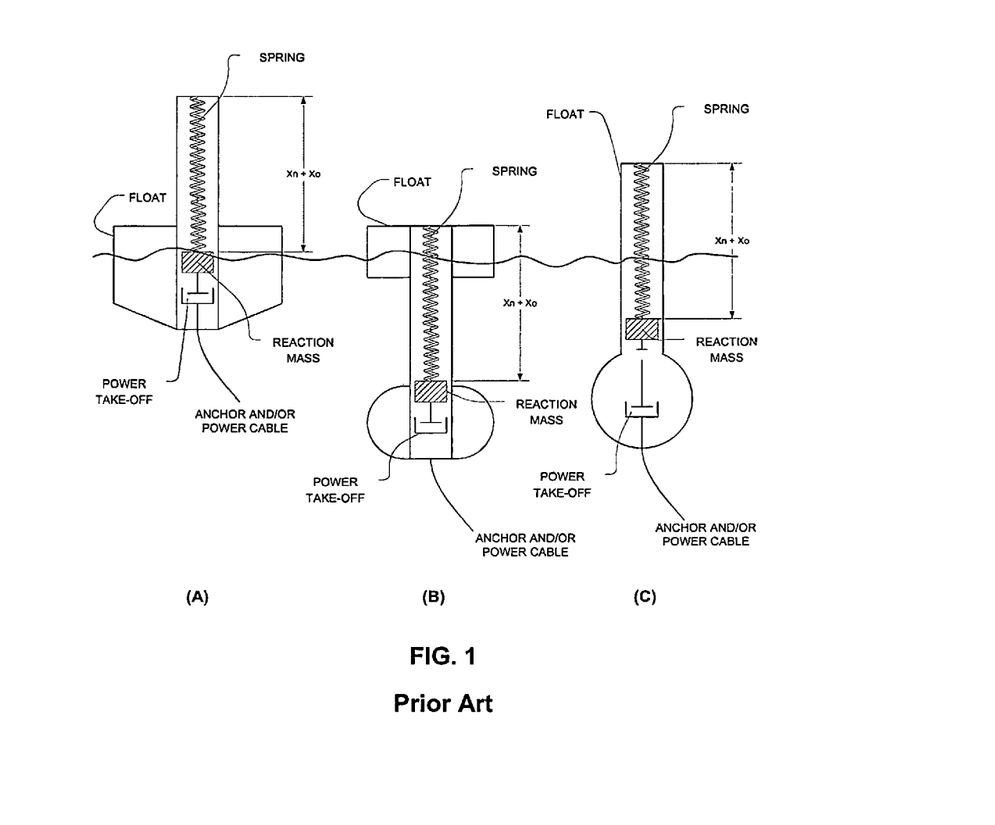
FIG. 1 is a prior art diagram of an internal mass and spring oscillator WEC system shown in U.S. Pat. No. 7,443,046.

Problems pertaining to the use of conventional mechanical spring systems are discussed in U.S. Pat. No. 7,443,046, issued to Stewart et al, (Stewart being the present applicant) and whose teachings are fully incorporated herein by reference. As noted in U.S. Pat. No. 7,443,046 the prior art (as shown in FIG. 1, hereof) requires a very long spring to achieve a mass-spring oscillation period near that of the dominant wave period. As discussed in the cited patent, it is not practical to construct or house a spring of required length within the float. The length of the spring in still water ($x_0$) can be determined by solving the two following equations simultaneously.

$$m \cdot g = k \cdot x \quad \text{Equation 1}$$

$$\sqrt{k/m} = f_n = 2\pi/T_n \quad \text{Equation 2}$$

Equation 1 shows that the downward force of the reaction mass (m·g) is equal to the upward force of the spring (k·x) in static conditions. Equation 2 shows that the mass (m) and spring force constant (k) can be selected to give the mass-spring oscillator a natural oscillating frequency near that of the predominant waves.

If the two equations are solved simultaneously, the still-water spring length ($x_0$) would be:

$$x_0 = (T_n/2\pi)^2 \cdot g \quad \text{Equation 3}$$

If the mass-spring system is tuned for a 4-second wave (T), the length of the spring ($x_0$) would be approximately 4 meters. If the mass-spring system is tuned for an 8-second wave (T), the length of the spring ($x_0$) would be approximately 16 meters.

Figure 2:
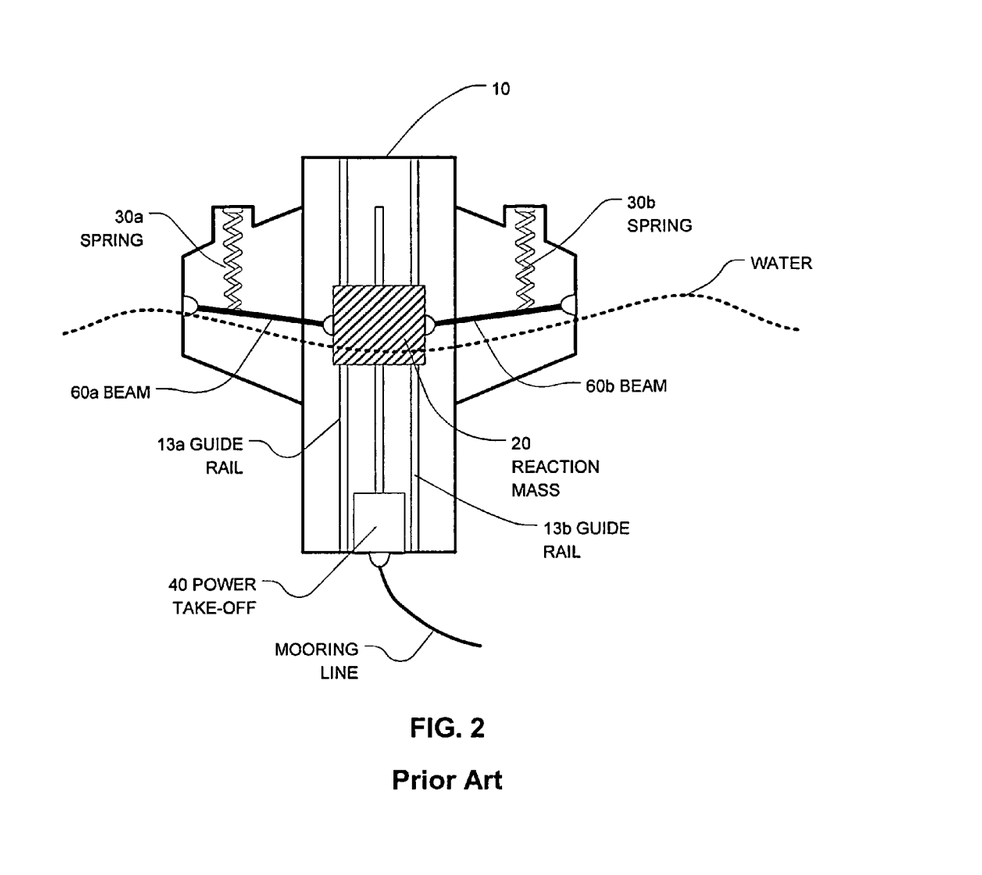
FIG. 2 is a prior art diagram of an internal mass and spring oscillator which corresponds to FIG. 5 of U.S. Pat. No. 7,443,046.

Applicant has previously suggested various systems for reducing the need for physically long springs. One of these includes a WEC device (see prior art FIG. 2 hereof which is a reproduction of FIG. 5 of U.S. Pat. No. 7,443,046) using a lever-based approach coupling the reaction mass and spring. Others include hydraulic-based, or pneumatic-based approaches, which solve the long-spring, long resonant period problem. These WEC systems are well-suited for many applications.

However, they may not be best suited for small and medium sized floats which require a more compact and more economical "oscillator" configuration.

SUMMARY OF THE INVENTION

The various deficiencies described above are overcome, or reduced, in systems embodying the invention.

The present invention uses an innovative double pulley configuration to reduce the size of the mass and spring system. The new approach is more compact than a lever arm approach for all applications, is less complex than a scissor approach for many applications, and is more efficient than a hydraulic or a pneumatic approach for low power applications.

In accordance with the invention, short, stiff springs are used in a configuration that allows the mass-spring oscillator system(s) to resonate with periods close to those of dominant wave periods, resulting in efficient wave energy capture.

A wave energy converter (WEC) buoy embodying the invention includes a float designed to extend along the surface of a body of water and to be responsive to the motion of waves in the body of water. The float includes a reaction mass and a spring for forming an internal "oscillator" to be contained within the float. Mounted within and along the top of the float are first and second pulleys which are mechanically coupled together and rotatably mounted so they rotate in tandem. The reaction mass is coupled via a first belt to the first pulley, with the first belt being wrapped around the first pulley. The spring is coupled via a second belt to the second pulley, with the second belt being wrapped around the second pulley. The diameter of the second pulley is different than the diameter of the first pulley to cause the reaction mass to travel a different distance than the spring. In systems embodying the invention, the spring is not in series with the reaction mass and does not limit its travel. They also have different travel paths and can travel different amounts.

In accordance with one embodiment the first and second pulleys are circular, with the diameter of the second pulley being made smaller than the diameter of the first pulley to cause the reaction mass to travel a greater distance than the spring.

In accordance with another embodiment the first pulley is circular and the second pulley is a cam; and wherein the cam is shaped to provide varying non-linear motion of the spring versus the relatively linear up down motion of the reaction mass.

An important aspect of this invention that differentiates it from previous inventions is that the length of the spring can be reduced using a simple arrangement of round pulleys and/or non-round cams. This enables the formation of an extremely compact internal oscillator for many WEC applications.

A power take off device (PTO) is coupled to the reaction mass for producing electric energy in response to the movement of the reaction mass. For example, the PTO device can include a ball screw system coupled to the reaction mass. In this case, a ball nut would be rigidly attached to the reaction mass, a ball screw would be attached to the shell using rotary bearings, and a rotary electric generator would be attached to the rotating ball screw. The spring can be a physical spring, such as a coil spring, or a pneumatic or hydraulic piston coupled to a gas-charged reservoir. Alternatively, the PTO device can be any one of a number of devices, including a linear electric generator (LEG), or a translator that converts linear motion and force to rotary motion and force, coupled to a rotary electric generator.

BRIEF DESCRIPTION OF THE DRAWINGS

In the accompanying drawings which are not drawn to scale, like reference characters denote like components.

DETAILED DESCRIPTION OF THE INVENTION

The invention is illustrated for use in wave energy applications. However it should be understood that it is of general applicability wherever a long physical spring needs to be replaced with a shorter, stiffer one.

Figure 3A:
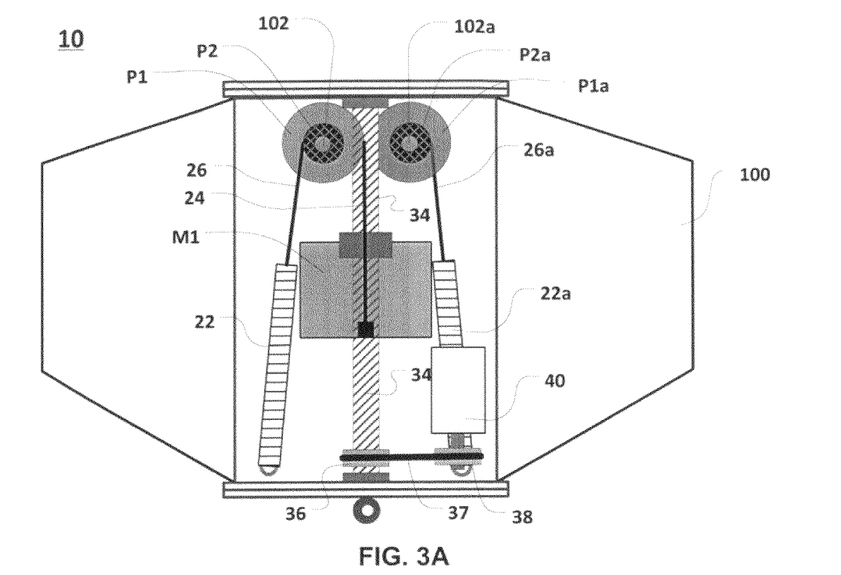
FIGS. 3A, 3B and 3C are highly simplified representational cross-sectional, side and top views, respectively, of a WEC with a pulley system embodying the invention.
Figure 3B:
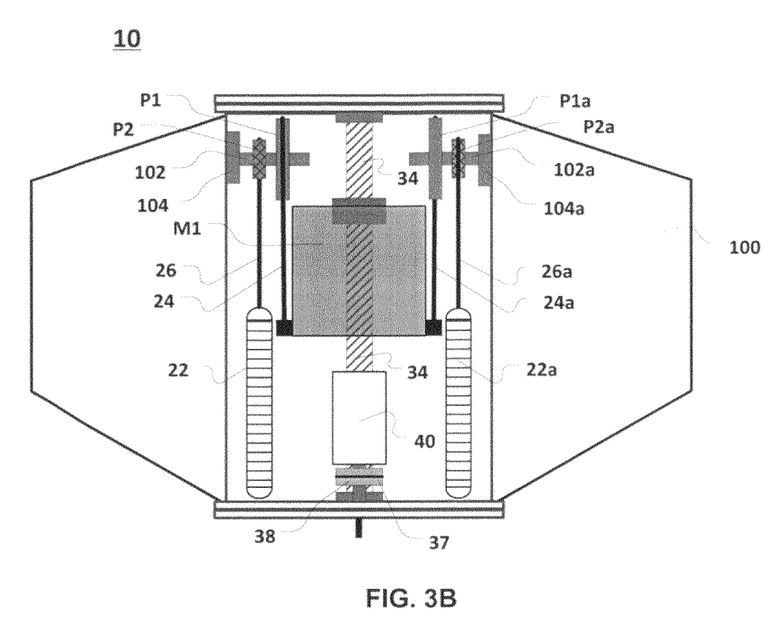
Figure 3C:
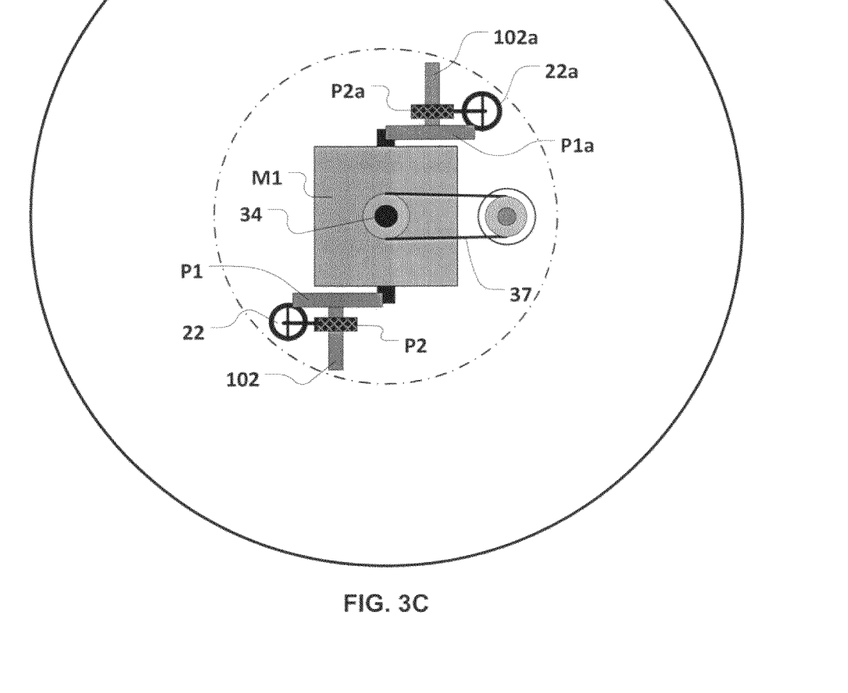

FIG. 3A is a cross sectional view, FIG. 3B is a side view and FIG. 3C is a top view of a WEC buoy 10 comprised of a float 100 containing a WEC device embodying the invention. FIGS. 3A, 3B and 3C are highly simplified representational drawings showing the use of springs and round pulleys to form an internal "oscillator" which is compact and economic. In FIGS. 3A, 3B and 3C, the WEC device has a single reaction mass (M1), but more than one could be used. The weight of the reaction mass is supported by one, or more, flexible belts (or linking mechanism) that are attached to pulleys.

The WEC system 10 may be an enclosed (e.g., like a tuna can) or open (like a ship) container having any suitable shape designed to float on, or within, the water and to be responsive (i.e., move) to the motion of the waves. In the Figs. the WEC 10 includes a float 100 in which is included an internal oscillator comprising reaction mass M1 and a spring 22 contained within the central portion of the float. The reaction mass M1 is connected to one end of a belt 24 whose other end is wound around and attached to the top edge (e.g., circumference) of a round pulley P1. The spring 22 is connected to one end of a belt 26 whose other end is wound around and attached to the top edge (e.g., circumference) of a round pulley P2. In accordance with the invention, the diameter of P1 is typically greater than the diameter of P2. P1 and P2 are mechanically coupled (keyed) to each other so they move in tandem. In FIGS. 3A, 3B, and 3C, pulleys P1 and P2 are mounted on the same shaft 102. So, in accordance with one aspect of the invention, there are two (round) pulleys, P1 and P2, on a common shaft (actually, or in effect) so the pulleys (P1 and P2) rotate in tandem. The pulley P2 of smaller diameter may be mechanically coupled to the larger pulley P1 that supports the reaction mass. This coupling can be, for example, accomplished by locking (keying) the large pulley and the small pulley to a common shaft (axle). Alternatively, the larger and smaller pulley can be mechanically attached to each other (e.g. bolted together) and mounted on a common shaft. The belt/cable 26 attached between the spring and the smaller pulley (P2) wraps around the smaller pulley in a direction opposite that of the belt/cable 24 that is attached between the reaction mass and the larger pulley (P1).

In the embodiment shown in these figures, in response to motion of the waves and the corresponding motion of the float 100, the reaction mass M1 moves up and down along a ball screw mechanism 34 which converts the linear force and motion of the reaction mass into rotary torque and motion. As shown in the figures, the screw mechanism causes a pulley 36 to rotate and drive via a belt 37 a pulley 38 which is used to drive a rotary electric generator 40. It should be clear from the figures that in accordance with the invention, the reaction mass moves along a travel path which is independent of the path along which the spring extends and retracts. Thus, the stroke (i.e., the path of travel of the reaction mass) is not limited by having a spring in series with the mass. In FIGS. 3A-3C, two separate pulley systems are shown to be formed to operate on the reaction mass. There could be only one pulley system or more than two pulley systems and even more than one reaction mass.

Figure 4A:
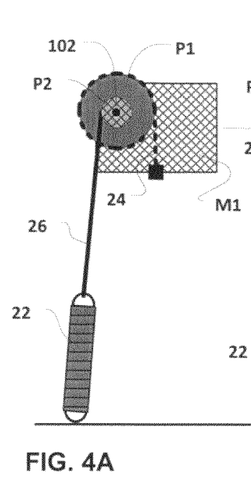
FIGS. 4A, 4B and 4C are highly simplified drawings of part of the pulley system of FIGS. 3A and 3B illustrating different positions of the reaction mass and corresponding variations in the spring length in accordance with the invention.
Figure 4B:
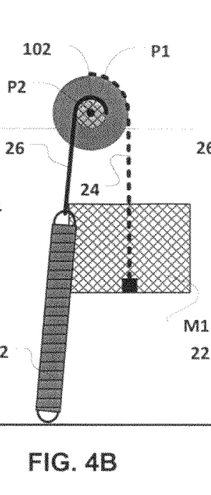
Figure 4C:
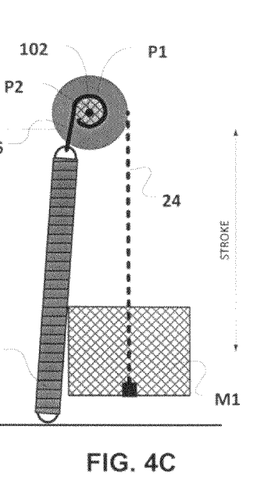

The operation of the system may be explained with reference to FIGS. 4A, 4B, and 4C. For purpose of illustration, assume that FIG. 4B represents the still water position, while FIGS. 4A and 4C represent the upper and lower conditions responsive to the waves. When the reaction mass M1 is at the top of its travel (FIG. 4A), belt 24 is wound around pulley P1 and belt 26 is unwound and extends from pulley P2 to spring 22. As the reaction mass moves downward, the pulleys P1 and P2 rotate and (see FIG. 4B) belt 24 unwraps from its pulley P1 while belt 26 wraps more around its pulley P2. When the reaction mass is at the bottom of travel (FIG. 4C), the belt 24 is nearly completely unwrapped from the pulley P1 and the belt 26 is almost completely wrapped around pulley P2. The energy imparted to the reaction mass by the waves may cause the reaction mass to move and the spring to develop forces causing up and down movement of the system and oscillation at the right frequencies. In FIGS. 3A-3C, the pulleys are supported by a rotating shaft 102. Pulley P1 is sized such that it makes less than one complete rotation when the reaction mass moves through its range of travel. With this pulley sizing approach, the diameter, Dm, of pulley P1 is at least equal to STROKE hr. It is possible to use pulleys of smaller diameter in applications where it is acceptable for the belt to overlap (i.e. the belt makes more than one complete wrap around the pulley and lies on top of another layer of belt).

The belt/cable 26 connected to the smaller pulley P2 is attached to a short, stiff spring 22. The large pulley P1 has a diameter denoted "Dm" ("m" for reaction mass). The small pulley has a diameter denoted "Ds" ("s" for spring). The ratio of the diameters of the two pulleys is R=Dm/Ds.

So, when the reaction mass travels a distance $(\pi)(Dm)$, the spring travels a distance $\pi Ds$. If the value of Ds is equal to Dm/2, then the spring would travel ½ the distance traveled by the mass. Therefore, an advantage of this set-up is that the travel of the spring is 1/R that of the reaction mass. The force applied by the spring as "seen" by the reaction mass is also 1/R. The force acting on the spring is R times the force of the reaction mass acting on its supporting belt. Thus, the combination of large and small pulleys allows a short, stiff spring to be used instead of a long, soft spring in order to achieve a long resonant period, and the overall envelope (size) of the mass-spring system is greatly reduced (compared to a system without the pulleys). As an example, Dm and Ds could be 200 mm and 100 mm, respectively. R would then be 2. The stroke of the spring would then be ½ that of the reaction mass.

Figure 5:
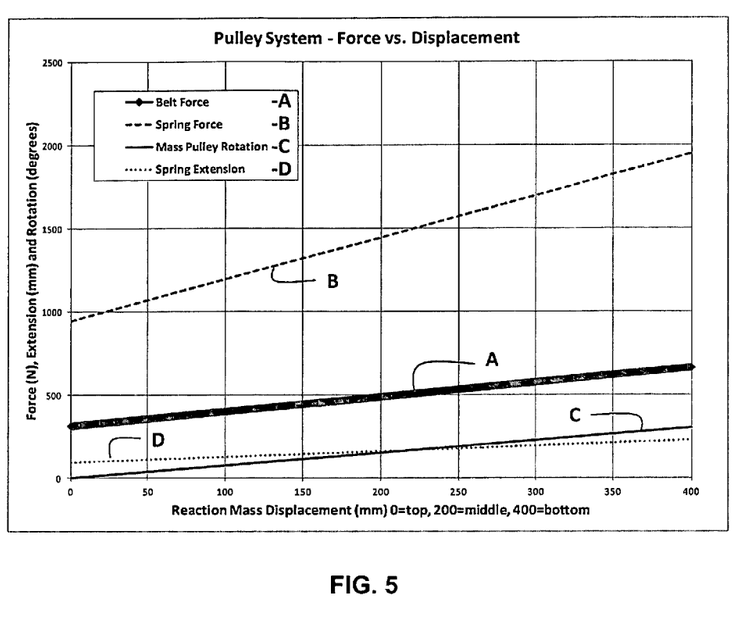
FIG. 5 is a graph showing the relationships of spring force versus spring displacement (extension) and effective spring force as "seen" by the reaction mass versus reaction mass displacement in a system of the type shown in FIGS. 3A and 3B.

Waveforms A, B C and D of FIG. 5 show characteristics of an embodiment of the invention for the case where it is assumed that a single reaction mass of 50 kg and a single spring are used and where the stroke of the reaction mass is 400 mm and where the diameter of P1 is 150 mm and the diameter of P2 is 50 mm, and the spring constant (k) of the spring is 7500N/m. Waveform A shows the effective spring rate of the belt acting on the reaction mass. Waveform B shows the spring rate (i.e. force per displacement or extension) of the spring. Note that the force per displacement of the spring pulley on the reaction is substantially smaller than of the spring itself. The graph of FIG. 5 shows that the spring exerts a force sufficient to overcome the static gravitational force acting on the reaction mass while also providing a "soft" spring behavior needed for mass-spring system resonance at the desired frequency (or dominant wave period). Curves C shows that the rotation of the pulley P1 is less than 360 degrees, which means that the belt does not wrap over itself as the reaction mass moves through its complete range of travel. Curve D shows that the displacement of the spring is less than the displacement (or stroke) of the reaction mass.

As shown for FIG. 4B, the force applied by the spring to the reaction mass is just sufficient to compensate for gravity acting on the reaction mass. In this case, the spring supports the reaction mass with a force of 490N (F=M×g, F=50 kg×9.8 m/s) when the reaction mass is at mid-stroke (i.e. at 200 mm which corresponds to the still water condition of FIG. 4B). As the reaction mass moves up or down, the force of the spring is reduced or increased by 7500N/m. The rate of change in force of the belt pulling on the reaction mass is 833 N/m, which is $1/9^{th}$ (=$1/R^2$) the actual spring constant of the spring. Thus, it is demonstrated that the rate of change in force of the spring acting on the reaction mass is many times less than the rate of change of the spring force of the actual spring. This reduction in spring rate (i.e. force per displacement) is significant because it allows a long mass-spring resonant period to be achieved with a compact, stiff spring.

The resonant period of the mass-spring system is given by the following equation:

$$T_n \cdot 2\pi \cdot \sqrt{\frac{M}{K}} \text{ sec} \qquad \text{Equation 4}$$

This natural period can be selected to be near the predominant wave period or some other optimal wave period determined by analysis. For the example system with one large pulley and one small pulley, the effective spring constant, K, observed at the reaction mass is 833N/m and the mass, M, is 50 kg. The natural period is then 1.5 seconds. If the pulleys had not been used, the spring constant, K, experienced at the reaction mass would be 7500N/m, and the natural period would be 0.5 seconds. In this example, it is shown that a small, stiff spring can be used with coupled pulleys of different size to stretch the resonant period of the mass-spring system. As a general proposition the reaction mass and the spring are interconnected to form an oscillator whose frequency of oscillation corresponds generally to the average frequency of the waves.

Figure 6A:
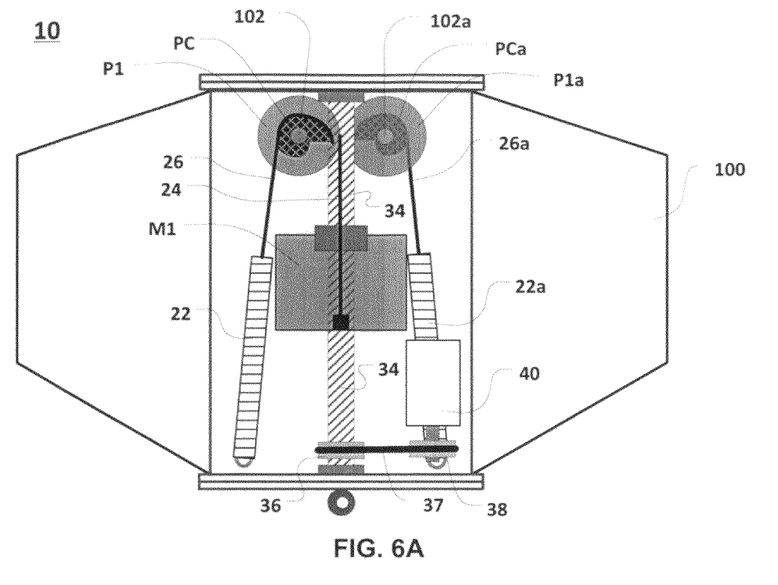
FIGS. 6A, 6B and 6C are highly simplified representational cross-sectional, side and top views, respectively, of a WEC with a cam pulley for controlling the spring and a round pulley for controlling the reaction mass system, in accordance with the invention.
Figure 6B:
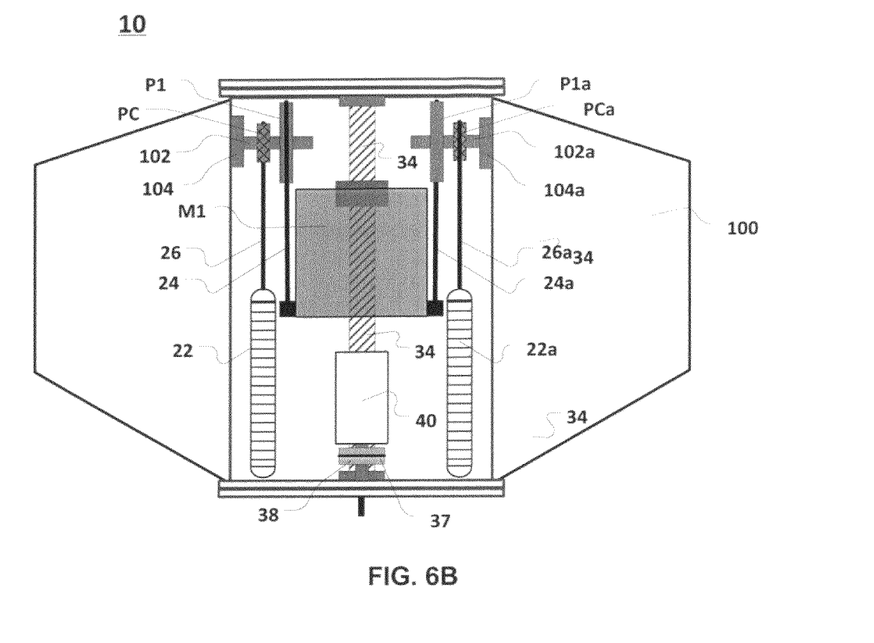
Figure 6C:
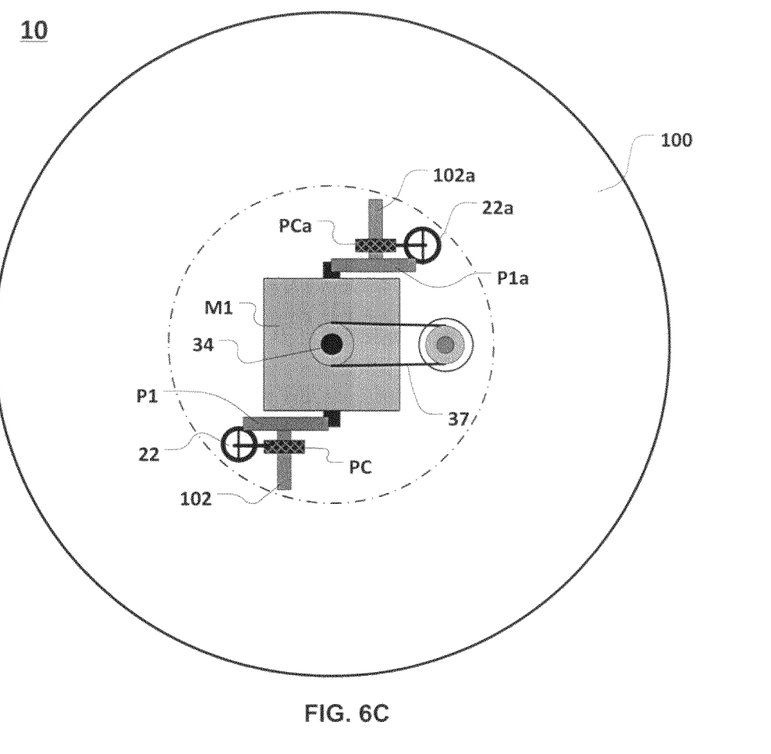

FIGS. 6A, 6B and 6C show a variation of the embodiments of FIGS. 3A, 3B and 3C. In FIGS. 6A-6C, the second pulley P2 (which is connected to the spring) of FIGS. 3A-3C is replaced with a "cam" pulley, Pc, which is coupled to the spring. Otherwise, FIGS. 6A, 6B and 6C correspond to FIGS. 3A, 3B and 3C, respectively, and need not be dtailed. Pulley Pc is a cam having a variable radius, while the pulley P1 connected to the reaction mass is a round pulley as in FIGS. 3A-3C. That is pulley Pc is a non-round (non-circular) cam coupled to the spring. The radius of the pulley Pc can vary over a wide range (e.g., from a value which is equal to that of P1 to a much smaller value). The non-round shape of the cam can be used to make the non-linear characteristic of a spring appear linear from the reaction mass perspective. Alternatively, the characteristic of a linear or near-linear spring can be made to appear non-linear from the reaction mass perspective. In the latter case, it is possible to design the cam profile such that the effective spring rate at the reaction mass increases and decreases in a way to keep the reaction mass from hitting the top and bottom end stops and to increase the force needed to keep the reaction mass within it desired range of travel.

Figures 7A, 7B, 7C:
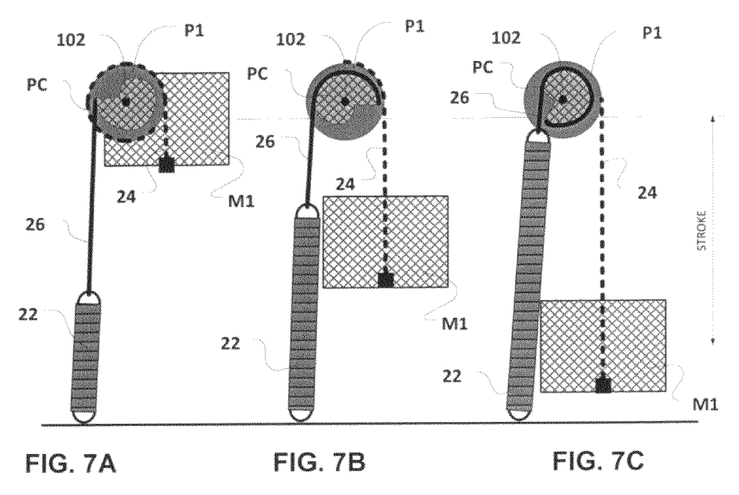
FIGS. 7A, 7B and 7C are highly simplified drawings showing the operation of the system of FIG. 6.

FIGS. 7A, 7B and 7C correspond to FIGS. 4A, 4B and 4C except for the change introduced by the use of the cam Pulley Pc instead of Pulley P2. In FIGS. 6A-6C and 7A-7C, the non-round (non-circular) spring pulley Pc is mechanically linked (coupled) to the larger reaction mass pulley P1 that supports the reaction mass such that they rotate in tandem. The mechanical linkage (coupling) can be accomplished by locking (keying) the large pulleys and the cams to common shafts (axles). Alternatively, P1 and Pc can be mechanically attached to each other (e.g. bolted together) and mounted on common shafts. A belt or cable is attached to the spring cam, which wraps around the cam in a direction opposite that of the belt that wraps around the reaction mass pulley. The belts connected to the spring cams are attached to short, stiff spring.

What is claimed is:

1. A wave energy converter (WEC) buoy comprising:
  a floating body designed to extend along the surface of a body of water and to be responsive to motion of waves in the body of water;
  first and second pulleys, located within said floating body, mounted on a shaft and arranged to rotate in tandem;
  first cabling means connected at one end to a reaction mass and at its other end around the first pulley;
  second cabling means connected at one end to a spring and at its other end around the second pulley; and
  wherein the diameter of the second pulley is different than the diameter of the first pulley to cause the reaction mass to travel a different distance than the spring.

2. A wave energy converter (WEC) buoy as claimed in claim 1, wherein said first and second cabling means are belts wound around their respective pulleys such that when the first belt is being pulled down the second belt is being pulled up and vice versa.

3. A wave energy converter (WEC) buoy as claimed in claim 1, wherein the first and second pulleys are circular and wherein the diameter of the second pulley is smaller than the diameter of the first pulley to cause the reaction mass to travel a greater distance than the spring.

4. A wave energy converter (WEC) buoy as claimed in claim 1, wherein the first pulley is circular and the second pulley is a cam; and wherein the cam is shaped to provide varying motion of the spring versus the relatively linear up down motion of the reaction mass.

5. A wave energy converter (WEC) buoy as claimed in claim 1, further including a power take off device (PTO) coupled to the reaction mass for producing electric energy in response to the movement of the reaction mass.

6. A wave energy converter (WEC) buoy as claimed in claim 1, further including a power take off device (PTO) coupled to the reaction mass for producing electric energy in response to the movement of the reaction mass, said PTO including a ball screw mechanism driven by the reaction mass and an electric generator driven by the ball screw mechanism for producing electric energy in response to the movement of the reaction mass.

7. A wave energy converter (WEC) buoy as claimed in claim 1, wherein the reaction mass and the spring are interconnected to form an oscillator whose frequency of oscillation corresponds generally to the average frequency of the waves.

8. A wave energy converter (WEC) buoy as claimed in claim 1, wherein the resonant period (Tn) of the reaction mass and the spring system is given by the following equation:

$$T_n = 2\pi \cdot \sqrt{\frac{M}{K}} \sec$$

Where Tn is selected to be near the predominant wave period or some other optimal wave period determined by analysis; and K is the effective spring constant.

9. A wave energy converter (WEC) buoy as claimed in claim 1 wherein said shaft is secured to the floating body.

10. A wave energy converter (WEC) buoy comprising:
a floating container designed to extend along the surface of a body of water and to be responsive to motion of waves in the body of water; said floating container having a top and a bottom;
a reaction mass and a spring for forming an oscillator to be contained within the float;
first and second pulleys mechanically coupled together and mounted on a rotating shaft, attached to the container, so they rotate in tandem;
first belt means connected at one end to the reaction mass and at its other end around the first pulley;
second belt means connected at one end to the spring and at its other end around the second pulley; and
wherein the diameter of the second pulley is smaller than the diameter of the first pulley to cause the reaction mass to have greater travel than the spring.

* * * * *